US012518135B2

(12) United States Patent
Zhao et al.

(10) Patent No.: US 12,518,135 B2
(45) Date of Patent: Jan. 6, 2026

(54) SPARSE AND DIFFERENTIABLE MIXTURE OF EXPERTS NEURAL NETWORKS

(71) Applicant: Google LLC, Mountain View, CA (US)

(72) Inventors: Zhe Zhao, Palo Alto, CA (US);
Maheswaran Sathiamoorthy, Santa Clara, CA (US); Lichan Hong, Mountain View, CA (US); Yihua Chen, Sunnyvale, CA (US); Ed Huai-Hsin Chi, Palo Alto, CA (US); Aakanksha Chowdhery, Mountain View, CA (US); Hussein Hazimeh, Cambridge, MA (US)

(73) Assignee: Google LLC, Mountain View, CA (US)

( * ) Notice: Subject to any disclaimer, the term of this patent is extended or adjusted under 35 U.S.C. 154(b) by 1009 days.

(21) Appl. No.: 17/665,279

(22) Filed: Feb. 4, 2022

(65) Prior Publication Data

US 2022/0253680 A1 Aug. 11, 2022

Related U.S. Application Data

(60) Provisional application No. 63/146,452, filed on Feb. 5, 2021.

(51) Int. Cl.
*G06N 3/04* (2023.01)
*G06F 18/20* (2023.01)
*G06F 18/25* (2023.01)
*G06N 3/045* (2023.01)
*G06N 3/048* (2023.01)

(52) U.S. Cl.
CPC ............. *G06N 3/045* (2023.01); *G06F 18/25* (2023.01); *G06F 18/285* (2023.01); *G06N 3/048* (2023.01)

(58) Field of Classification Search
CPC ......... G06N 3/045; G06N 3/048; G06F 18/25
See application file for complete search history.

(56) References Cited

U.S. PATENT DOCUMENTS

2019/0251423 A1* 8/2019 Shazeer ................. G06N 3/045
2022/0156658 A1* 5/2022 Mohan ................ H04L 41/0654

OTHER PUBLICATIONS

Wang, Xin, et al. "Deep mixture of experts via shallow embedding." Uncertainty in artificial intelligence. PMLR, 2020. (Year: 2020).*
(Continued)

*Primary Examiner* — Hal Schnee
(74) *Attorney, Agent, or Firm* — Fish & Richardson P.C.

(57) ABSTRACT

A system including a main neural network for performing one or more machine learning tasks on a network input to generate one or more network outputs. The main neural network includes a Mixture of Experts (MoE) subnetwork that includes a plurality of expert neural networks and a gating subsystem. The gating subsystem is configured to: apply a softmax function to a set of gating parameters having learned values to generate a respective softmax score for each of one or more of the plurality of expert neural networks; determine a respective weight for each of the one or more of the plurality of expert neural networks; select a proper subset of the plurality of expert neural networks; and combine the respective expert outputs generated by the one or more expert neural networks in the proper subset to generate one or more MoE outputs.

21 Claims, 3 Drawing Sheets

(56) References Cited

OTHER PUBLICATIONS

Bengio et al, "Conditional computation in neural networks for faster models" arXiv, 2015, 9 pages.
Bengio et al, "Estimating or propagating gradients through stochastic neurons for conditional computation" arXiv, 2013, 12 pages.
Caruana, "Multitask learning" Machine Learning, 1997, 35 pages.
Devlin et al, "BERT: Pre-training of Deep Bidirectional Transformers for Language Understanding" arXiv, 2019, 16 pages.
Duchi et al, "Adaptive subgradient methods for online learning and stochastic optimization" JMLR, 2011, 39 pages.
Fedus et al, "Switch transformers: Scaling to trillion parameter models with simple and efficient sparsity" arXiv, 2021, 31 pages.
Harper et al, "The movielens datasets: history and context" ACM, 2015, 19 pages.
Hazimeh et al, "The tree ensemble layer: Differentiability meets conditional computation" ICML, 2020, 11 pages.
Ioannou et al, "Decision forests, convolutional networks and the models in-between" arXiv, 2016, 9 pages.
Jacobs et al, "Adaptive mixtures of local experts" Neural computation, 1991, 9 pages.
Jang et al, "Categorical reparameterization with gumbel-softmax" arXiv, 2016, 12 pages.
Jiang et al, "On the identifiability of mixtures-of-experts" Neural Networks, 1999, 6 pages.
Jordan et al, "Hierarchical mixtures of experts and the em algorithm" Neural Computation, 1994, 32 pages.
Kingma et al, "Adam: A method for stochastic optimization" arXiv, 2014, 9 pages.
Lepikhin et al, "GSHARD: Scaling giant models with conditional computation and automatic sharding" arXiv, 2020, 35 pages.
Ma et al, "Modeling task relationships in multi-task learning with multi-gate mixture-of-experts" ACM SIGKDD, 2018, 10 pages.
Maziarz et al., "Gumbel-matrix routing for flexible multi-task learning" arXiv, 2019, 15 pages.
Raffel et al, "Exploring the Limits of Transfer Learning with a Unified Text-to-Text Transformer" arXiv, 2019, 52 pages.
Ramachandran et al, "Diversity and depth in per-example routing models" ICLR, 2018, 12 pages.
Rosenbaum et al, "Routing networks: adaptive selection of non-linear functions for multi-task learning" ICLR, 2018, 16 pages.
Ruder, "An overview of multi-task learning in deep neural networks" arXiv, 2017, 14 pages.
Sabour et al, "Dynamic routing between capsules" NIPS, 2017, 11 pages.
Shazeer et al, "Outrageously large neural networks: The sparsely-gated mixture-of-experts layer" arXiv, 2017, 19 pages.
Sun et al, "AdaShare: Learning what to share for efficient deep multi-task learning" arXiv, 2019, 12 pages.
Vaswani et al, "Attention Is All You Need" arXiv, 2017, 15 pages.
Wang et al, "Skipnet: Learning dynamic routing in convolutional networks" ECCV, 2018, 19 pages.
Wang et al, "Small towers make big differences" arXiv, 2020, 17 pages.
Xiao et al, "Fashion-MNIST: a novel image dataset for benchmarking machine learning algorithms" arXiv, 2017, 6 pages.
Zhao et al, "Recommending what video to watch next: a multitask ranking system" ACM, 2019, 9 pages.

\* cited by examiner

SPARSE AND DIFFERENTIABLE MIXTURE OF EXPERTS NEURAL NETWORKS

CROSS-REFERENCE TO RELATED APPLICATION

This application claims priority to U.S. Provisional Application No. 63/146,452, filed on Feb. 5, 2021. The disclosure of the prior application is considered part of and is incorporated by reference in the disclosure of this application.

BACKGROUND

This specification relates to performing a machine learning task on a network input using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current value inputs of a respective set of parameters.

SUMMARY

This specification describes a system implemented as computer programs on one or more computers in one or more locations that performs one or more machine learning tasks on a network input.

To perform the one or more machine learning tasks, the system includes a neural network that includes a mixture of experts (MoE) subnetwork. The MoE subnetwork includes multiple expert neural networks. Each expert neural network in the MoE subnetwork can be configured to process the network input, data derived from the network input, or both in accordance with a respective set of expert parameters of the expert neural network to generate a respective expert output. The MoE subnetwork further includes a gating subsystem that, with a novel, binary encoding configuration, facilitates a sparse and continuously differentiable selection of a proper subset of the plurality of expert neural networks for use in generating the MoE output for each of the one or more machine learning tasks. In some implementations, the MoE subnetwork is arranged between a first neural network layer and a second neural network layer in the neural network, and each expert neural network is configured to receive as input an output of the first neural network layer. In other implementations, the MoE subnetwork is configured to directly receive the input to the neural network.

The subject matter described in this specification can be implemented in particular embodiments so as to realize one or more of the following advantages.

While some existing MoE implementations can improve computational capacity without greatly increasing computing resource requirements, for example, by requiring that only a small number of the expert neural networks are selected during the processing of any given network input by the neural network, these MoE implementations typically involve significant training time and associated computational costs. This is usually due to the non-differentiable nature of the gating or routing mechanism utilized in many of these exiting MoE implementations which render known efficient training methods impossible or otherwise infeasible.

The techniques described in this specification incorporate a gating mechanism for the MoE that is both sparse and continuously differentiable based on a novel binary encoding method, allowing for the neural network to be effectively trained using gradient-based optimization techniques such as stochastic gradient descent (SGD), Adam, or Adagrad techniques and in an end-to-end fashion. Further, the techniques described in this specification facilitate explicit control, e.g., by a user of the system, over the number of expert neural networks to select for use in computing an inference for any given machine learning task, thereby maintaining resource efficiency after the training, i.e., at run time. Hence, the training time and computing resources necessary to train and use the neural network to achieve or even exceed the state-of-the-art on a range of machine learning tasks, e.g., large-scale content item recommendation tasks, can be maintained at a reasonable level. That is, computational capacity of the neural network can be greatly increased while maintaining a reasonable training time and without greatly increasing how many computing resources are required to train the neural network.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
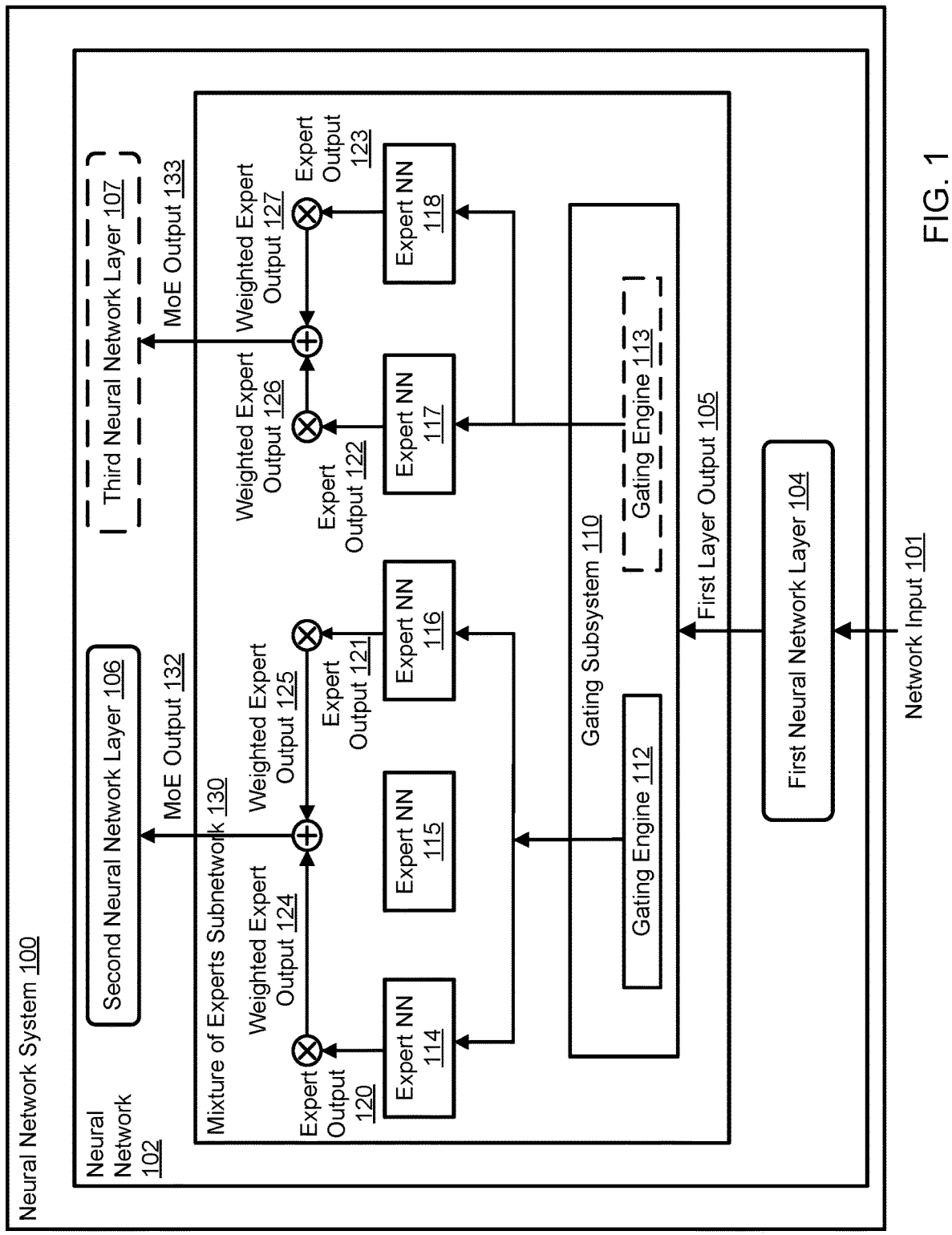
FIG. 1 shows an example neural network system.

FIG. 1 shows an example neural network system 100. The neural network system 100 is an example of a system implemented as computer programs on one or more computers in one or more locations, in which the systems, components, and techniques described below can be implemented. The neural network system 100 can perform one or more machine learning tasks on a network input.

Generally, the neural network system 100 includes a neural network 102 that can be configured to receive any kind of digital data input 101 and to generate any of a variety of kinds of score, classification, or regression output based on the input 101.

In some cases, the neural network 102 is a neural network that is configured to perform an image processing task, i.e., receive an input image and to process the input image to generate a network output for the input image. For example, the task may be image classification and the output generated by the neural network for a given image may be scores for each of a set of object categories, with each score representing an estimated likelihood that the image contains an image of an object belonging to the category. As another example, the task can be image embedding generation and the output generated by the neural network can be a numeric embedding of the input image. As yet another example, the task can be object detection and the output generated by the neural network can identify locations in the input image at which particular types of objects are depicted. As yet another example, the task can be image segmentation and the output generated by the neural network can assign each pixel of the input image to a category from a set of categories.

As another example, if the inputs to the neural network 102 are Internet resources (e.g., web pages), documents, or portions of documents or features extracted from Internet resources, documents, or portions of documents, the task can be to classify the resource or document, i.e., the output generated by the neural network for a given Internet resource, document, or portion of a document may be a score for each of a set of topics, with each score representing an estimated likelihood that the Internet resource, document, or document portion is about the topic.

As another example, if the inputs to the neural network 102 are features of an impression context for a particular advertisement, the output generated by the neural network may be a score that represents an estimated likelihood that the particular advertisement will be clicked on.

As another example, if the inputs to the neural network 102 are features of a personalized recommendation for a user, e.g., features characterizing the context for the recommendation, e.g., features characterizing previous actions taken by the user, the output generated by the neural network may be a score for each of a set of content items, with each score representing an estimated likelihood that the user will respond favorably to being recommended the content item.

As one example, the task may be a neural machine translation task. For example, if the input to the neural network 102 is a sequence of text, e.g., a sequence of words, phrases, characters, or word pieces, in one language, the output generated by the neural network may be a translation of the sequence of text into another language, i.e., a sequence of text in the other language that is a translation of the input sequence of text. As a particular example, the task may be a multi-lingual machine translation task, where a single neural network is configured to translate between multiple different source language—target language pairs. In this example, the source language text may be augmented with an identifier that indicates the target language into which the neural network should translate the source language text.

As another example, the task may be an audio processing task. For example, if the input to the neural network 102 is a sequence representing a spoken utterance, the output generated by the neural network may be a score for each of a set of pieces of text, each score representing an estimated likelihood that the piece of text is the correct transcript for the utterance. As another example, if the input to the neural network is a sequence representing a spoken utterance, the output generated by the neural network can indicate whether a particular word or phrase ("hotword") was spoken in the utterance. As another example, if the input to the neural network is a sequence representing a spoken utterance, the output generated by the neural network can be a classification of the spoken utterance into one of a plurality of categories, for example an identity of the natural language in which the utterance was spoken.

As another example, the task can be a natural language processing or understanding task, e.g., an entailment task, a paraphrase task, a textual similarity task, a sentiment task, a sentence completion task, a grammaticality task, and so on, that operates on a sequence of text in some natural language.

As another example, the task can be a text to speech task, where the input to the neural network 102 is text in a natural language or features of text in a natural language and the network output is a spectrogram, a waveform, or other data defining audio of the text being spoken in the natural language.

As another example, the task can be a health prediction task, where the input to the neural network 102 is a sequence derived from electronic health record data for a patient and the output is a prediction that is relevant to the future health of the patient, e.g., a predicted treatment that should be prescribed to the patient, the likelihood that an adverse health event will occur to the patient, or a predicted diagnosis for the patient. Such electronic health data may, for example, comprise one or more sequences of physiological data taken from a patient, with the output being a corresponding prediction that relates to those sequences of data. Examples of physiological data and a corresponding prediction include: blood glucose measurements, with the prediction being a predicted future blood glucose measurement or the prediction of a hyper- or hypo-glycemic event; a heart rate, with the prediction being the presence or absence of a heart condition, or a future cardiac event; blood pressure measurements, with the prediction being the risk of a future heart condition; or the like.

As another example, the task can be a text generation task, where the input to the neural network 102 is a sequence of text, and the output is another sequence of text, e.g., a completion of the input sequence of text, a response to a question posed in the input sequence, or a sequence of text that is about a topic specified by the first sequence of text. As another example, the input to the text generation task can be an input other than text, e.g., an image, and the output sequence can be text that describes the input.

As another example, the task can be an image generation task, where the input to the neural network 102 is a conditioning input and the output is a sequence of intensity value inputs for the pixels of an image.

As another example, the task can be an agent control task, where the input to the neural network 102 is a sequence of observations or other data characterizing states of an environment and the output defines an action to be performed by the agent in response to the most recent data in the sequence. The agent can be, e.g., a real-world or simulated robot, a control system for an industrial facility, or a control system that controls a different kind of agent. The observations may comprise sensor data captured by sensors associated with (e.g. part of) the agent, for example visual data, LIDAR data, sonar data, agent configuration data (e.g. joint angles), agent orientation data, or the like.

As another example, the task can be a genomics task, where the input to the neural network 102 is a sequence representing a fragment of a DNA sequence or other molecule sequence and the output is either an embedding of the fragment for use in a downstream task, e.g., by making use of an unsupervised learning technique on a data set of DNA sequence fragments, or an output for the downstream task. Examples of downstream tasks include promoter site prediction, methylation analysis, predicting functional effects of non-coding variants, and so on.

In some cases, the machine learning task is a combination of multiple individual machine learning tasks, i.e., the neural network 102 is configured to perform multiple different individual machine learning tasks, e.g., two or more of the machine learning tasks mentioned above. For example, the neural network can be configured to perform multiple individual natural language understanding tasks, with the network input including an identifier for the individual natural language understanding task to be performed on the network input.

The neural network 102 includes a stack of neural network layers. The stack of neural network layers can be any kind of neural network layers, for example, Long Short-Term Memory (LSTM) neural network layers or other recurrent neural network layers, convolutional neural network layers, fully-connected neural network layers, or attention neural network layers.

As a particular example of the type of layers that can be included in the neural network 102, an attention neural network layer can be configured to operate on a respective input sequence that includes a respective layer input at each of one or more positions. Each attention layer includes an attention sub-layer and, in some cases, a feed-forward sub-layer. The attention sub-layer receives the input sequence for the layer and applies an attention mechanism on the input sequence for the layer to generate an attended input sequence. The feed-forward sub-layer, when included, then operates on the attended input sequence to generate an output sequence for the layer.

Generally, the attention neural network layers can be arranged in any of a variety of configurations.

As one example, when the network input 101 is an input sequence, the attention neural network can include an encoder neural network that includes a subset of the plurality of layers and that encodes the input sequence to generate a respective encoded representation of each input in the sequence. In this example, the attention mechanism applied by the layers in the encoder is a self-attention mechanism, e.g., a multi-head self-attention mechanism.

As another example, the attention neural network can include a decoder neural network that includes a different subset of the plurality of layers and that processes either the network input or, when the attention neural network also includes the encoder neural network, the encoded representation of the network input to generate the network output. In some of these examples, when the network output is an output sequence, the decoder neural network operates auto-regressively and the attention sub-layers within some or all of the layers of the decoder apply masked self-attention over the partially generated output sequence. When the neural network includes both an encoder and a decoder, some of the layers in the decoder apply cross-attention into the encoded representations while others apply self-attention over the output sequence, either masked or not masked. When the attention neural network includes a decoder neural network that operates directly on the input sequence, the attention layers within the decoder can apply a self-attention mechanism over the input sequence.

The specifics of the operation of the attention layers within the decoder neural network and the encoder neural network are described in more detail in Vaswani, et al, attention Is All You Need, arXiv:1706.03762, and Raffel, et al, Exploring the Limits of Transfer Learning with a Unified Text-to-Text Transformer, arXiv:1910.10683, and Devlin et al, *BERT: Pre-training of Deep Bidirectional Transformers for Language Understanding*, arXiv:1810.04805, the entire contents of which are hereby incorporated by reference herein in their entirety.

In some implementations, the stack of neural network layers may include a mixture of two or more different kinds of neural network layers. In some implementations, the stack of neural network layers may be arranged in multiple branches that each include one or more neural network layers arranged in parallel with the neural network layer(s) included in another branch. To increase the computational capacity of the neural network 102, the neural network 102 includes one or more Mixture of Experts (MoE) subnetworks, with each MoE subnetwork being located between two of the stacked neural network layers.

In particular, as shown in FIG. 1, the neural network 102 includes a MoE subnetwork 130 arranged between a first neural network layer 104 and a second neural network layer 106 in the neural network 102. In addition, in the example of FIG. 1, the neural network 102 includes an optional, third neural network layer 107 that is arranged in parallel with the second neural network layer 106. The first neural network layer 104, the second neural network layer 106 and, when included, the third neural network layer 107, can be any kind of neural network layer, for example, a LSTM neural network layer or other recurrent neural network layer, a convolutional neural network layer, a fully-connected neural network layer, or an attention neural network layer. In some implementations, some or all of the first neural network layer 104, the second neural network layer 106, and the third neural network layer 107 can be other MoE subnetworks.

The MoE subnetwork 130 includes multiple expert neural networks, e.g., expert neural networks 114-118. Each expert neural network in the MoE subnetwork 130 can be configured to receive as input (referred to below as "expert input") either a first layer output 105 generated by the first neural network layer 104, or the network input 101, and to process the expert network input in accordance with a respective set of expert parameters of the expert neural network to generate a respective output (referred to below as "expert output").

While FIG. 1 shows that the MoE subnetwork 130 includes only five expert neural networks, in general, a MoE subnetwork can include a large number of expert neural networks, e.g., thousands of expert neural networks. In some implementations, each expert neural network can have a respective neural network architecture with its own parameters. In other implementations, the expert neural networks can have identical architectures, e.g., a feed-forward network architecture, but with different parameters. The expert neural networks may be configured to receive the same sized inputs and produce the same-sized outputs. Each expert neural network may have a very large number of parameters. For example, each expert neural network may have one to two million parameters, making the total number of parameters of the MoE subnetwork to billions of parameters.

Generally, each of the expert neural networks can have any of a variety of architectures that enables it to perform its function. In one example, when the network input includes image data, the expert neural network can be a convolutional neural network, e.g., can include a stack of one or more convolutional layers that are each optionally followed by a corresponding pooling layer. As another example, when the network input includes text data or other lower-dimensional data, the expert neural network can be a fully-connected neural network, e.g., can include a stack of one or more fully-connected layers that are each optionally followed by a corresponding non-linear activation layer.

Although the MoE subnetwork 130 includes a large number of expert neural networks, only a small number of them are selected during the processing of any given network input 101 by the neural network 102, e.g., only a small number of the expert neural networks are selected to process a respective expert input, i.e., to process either the first layer output 105 or the network input 101. The neural network 102 includes a gating subsystem 110 that is configured to select, based on respective weights computed for each of one or more of the plurality of the expert neural networks, only a proper subset of the expert neural networks. The gating subsystem 110 then provides the expert input to each of the selected expert neural networks. The gating subsystem 110 combines the expert outputs generated by the selected expert neural networks in accordance with the respective weights for the selected expert neural networks to generate one or more MoE outputs.

In particular, the gating subsystem 110 includes at least one gating engine that is configured to generate a weight vector that includes a respective weight for each of the plurality of expert neural networks in accordance with a set of gating parameters of the gating engine, and to select one or more of the expert neural networks based on the weights included in the weight vector. In some examples, the weight vector is a sparse n-dimensional vector that includes non-zero weight values for only a few of the expert neural networks in the set, and the gating engine selects only expert neural networks that have non-zero weights in the weight vector. The number of non-zero weights is an integer and is very small in comparison with the number of expert neural networks in the MoE subnetwork 130. For example, the MoE subnetwork 130 may have hundreds to thousands of expert neural networks, and the weight vector may have one or two non-zero weights.

In the implementations where the neural network 102 is configured to perform more than one machine learning task, the gating subsystem 110 can include multiple gating engines, e.g., each associated with a respective task. That is, the gating subsystem 110 can use different gating engines to select different subsets of expert neural networks for use in generating a respective MoE output for each of the multiple different tasks that the neural network 102 is configured to perform.

For example, as shown in FIG. 1, the gating subsystem 110 includes two gating engines 112 and 113. The gating engine 112 is configured to select, in accordance with a set of gating parameters of the gating engine 112, a first subset of the expert neural networks for generating the MoE output 132 for a first machine learning task. Likewise, the gating engine 113 is configured to select, in accordance with a set of gating parameters of the gating engine 113, a second subset of the expert neural networks for generating the MoE output 133 for a second machine learning task. In the example of FIG. 1, the expert neural networks 114 and 116 have non-zero weights determined by the gating engine 112 and therefore are selected for further processing to perform the first task, while the expert neural networks 117 and 118 have non-zero weights determined by the gating engine 113 and therefore are selected for further processing to perform the second task. In other words, the neural network 102 uses only the selected expert neural networks, i.e., not any of the remaining, unselected expert neural networks (e.g., expert neural network 115), to process the expert input and to generate the expert outputs. In some of these examples, although the first machine learning task is different from the second task, the corresponding subsets of expert neural networks that are being selected may overlap, i.e., a common expert neural network may be selected in performing different tasks.

For any given task that the neural network 102 is configured to perform, after the weight vector has been generated and one or more expert neural networks (e.g., expert neural networks 116 and 118) have been selected, the gating subsystem 110 combines the expert outputs generated by the selected expert neural networks by weighting the expert output generated by each of the selected expert neural networks (e.g., expert output 120 generated by the expert neural network 114 and expert output 121 generated by the expert neural network 116) by the weight for the selected expert neural network to generate a weighted expert output, and summing the weighted expert outputs (e.g., the weighted expert outputs 124 and 125) to generate the MoE output 132. Specifically, the weighted expert output can be determined by computing a product between the expert output and the corresponding weight. Likewise, for the second machine learning task, the gating subsystem 110 combines the expert outputs generated by the selected expert neural networks 117 and 118 by weighting the expert outputs 122 and 123 by the weight for the selected expert neural network to generate weighted expert outputs 126 and 127, and summing the weighted expert outputs 126 and 127 to generate the MoE output 133 for the second machine learning task.

While there exists other MoE models, many of these existing models may not be configurable to perform multiple tasks on a same network input. In addition, these existing MoE models are typically configured to perform this selection for performing the single task with the use a trainable sparse gate that is not differentiable, not continuous, or both. In the former case, reinforcement learning algorithms, which typically take longer time to run, are required to train these gates. In the latter case, the lack of continuity can lead to convergence issues in first-order optimization methods that in turn affect training effectiveness. By contrast, the selection mechanism adopted by the disclosed gating subsystem 110 is "smooth," i.e., continuously differentiable, and sparse. As will be described further below, this makes the training of the system easier.

In particular, the disclosed gating subsystem 110 uses a smoothened binary encoding scheme to enforce a cardinality constraint, i.e., selecting at most k (which may be a number specified by a user of the system that is smaller than n) out of a total of n expert neural networks, which by virtue of its differentiable nature can be effectively trained using first-order optimization methods such as stochastic gradient descent (SGD), Adam, or Adagrad. In addition, by virtue of its continuous nature of the selection mechanism adopted by the disclosed gating subsystem, convergence issues in the first-order optimization methods (that may otherwise arise in discontinuous models due to non-existent gradient for certain inputs) which affect statistical performance can be avoided during training. Further, the disclosed gating subsystem 110 supports conditional training: in backpropagation, for each training input, only the gradients of the loss with respect to the parameters of the selected expert neural networks need to be computed. Conditional training can thus lead to computational savings compared with dense training, where the gradients with respect to the parameters of all expert neural networks, even if not selected, will have to be computed during backpropagation.

In some implementations, the gating subsystem 110 then provides the MoE output 132 (or MoE output 133) as input to the second neural network layer 106 (or the third neural network layer 107) in the neural network for further processing so as to generate the output of the neural network 120 for a corresponding task from the network input 101. In some of these implementations, the second (or the third) neural network layer can be another MoE subnetwork. In other implementations, the gating subsystem directly provides the one or more MoE outputs as the outputs of the neural network 120 determined from the network input 101.

As a concrete example, the neural network 102 can be configured to perform two distinct image classification tasks on a network input 101 that includes an image, where the first task to predict a classification of an object or item depicted in a first portion of the image (e.g., at the top-left corner of the image), and the second task to predict a classification of another object or item depicted in a second portion of the image (e.g., at the bottom-right corner of the image) that is spatially separate from the first portion. In this example, the neural network 102 can include a MoE subnetwork sandwiched between (i) a stack of convolutional layers (where each of which may be followed by a corresponding pooling layer, e.g., a max or average pooling layer) configured to process the network input in a predetermined order to generate the MoE subnetwork input, and (ii) two task-specific output branches arranged in parallel with each other, where each output branch can include a stack of fully-connected layers (where each of which may be followed by a corresponding nonlinear activation layer, e.g., a ReLU or softmax activation layer) configured to process the MoE output in a predetermined order to generate an output that is specific to one of the two tasks. The MoE subnetwork can include two task-specific gating engines, and a total of eight expert neural networks each having an identical convolutional network architecture but different network parameters.

In some implementations, the gating subsystem 110 applies a static, i.e., input-agnostic, gate to the network input 101 by applying a softmax function to a set of gating parameters having values learned through training to generate a respective softmax score for each of one or more of the plurality of expert neural networks. The gating subsystem 110 also applies a smooth-step function to a corresponding index for each of the one or more of the plurality of expert neural networks to generate a smoothened one-hot encoding for each of the one or more of the plurality of expert neural networks. The details of the smooth-step function will be described further below with reference to FIG. 2, but in short, the smooth-step function outputs 0 or 1 exactly for inputs with an arbitrarily large magnitude. For example, the indices can have integer values, and the one-hot encodings can have binary values. The gating subsystem 110 then determines, from the smoothened one-hot encodings and the softmax scores, the respective weight for each of one or more of the plurality of expert neural networks.

Alternatively, in some other implementations, the gating subsystem 110 applies an input-dependent gate to the network input. That is, the gating subsystem 110 can route different inputs to the MoE subnetwork 130 to different expert neural networks, or to different combination of expert neural networks. To do this, the gating subsystem 110 applies a softmax function to (i) a first set of gating parameters having first learned values and (ii) the MoE subnetwork input to generate a respective softmax score for each of one or more of the plurality of expert neural networks. Specifically, the gating subsystem 110 can compute a first product of (i) the first set of gating parameters having first learned values and (ii) the MoE subnetwork input, and then apply the softmax function to the first product.

The gating subsystem 110 also applies a smooth-step function to (i) a second set of gating parameters having second learned values and (ii) the MoE subnetwork input to generate a smoothened one-hot encoding for each of the one or more of the plurality of expert neural networks. Likewise, the gating subsystem 110 can compute a second product of (i) the second set of gating parameters having second learned values and (ii) the MoE subnetwork input, and then apply the smooth-step function to the second product. The gating subsystem 110 then determines, from the smoothened one-hot encodings and the softmax scores, the respective weight for each of one or more of the plurality of expert neural networks.

Figure 2:
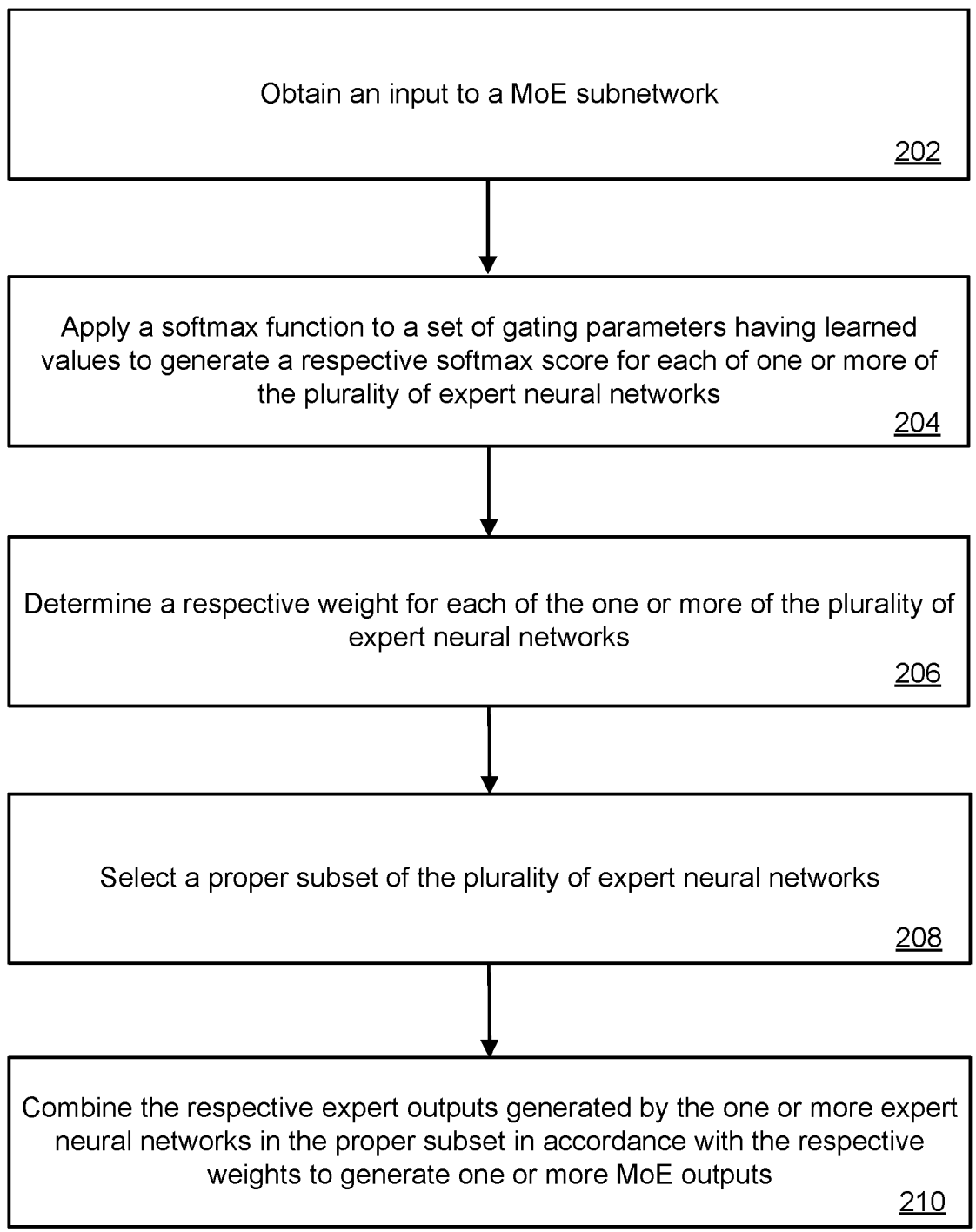
FIG. 2 is a flow diagram of an example process for generating one or more mixture-of-experts (MoE) outputs for an input using a MoE subnetwork.

FIG. 2 is a flow diagram of an example process 200 for generating one or more mixture-of-experts (MoE) outputs for an input using a MoE subnetwork, e.g., the MoE subnetwork 130 of FIG. 1. For convenience, the process 200 will be described as being performed by a system of one or more computers located in one or more locations. For example, a neural network system, e.g., the neural network system 100 of FIG. 1, appropriately programmed, can perform the process 200.

By performing process 200 the system can generate the one or more MoE outputs through "static gating," where a subset of expert neural networks included in a MoE subnetwork is selected independently from the input. In particular, the system can generate respective MoE outputs for one or more machine learning tasks on a same network input.

The system obtains an input to a MoE subnetwork (step 202). In some implementations, the MoE subnetwork input can be a first layer output generated by a neural network layer preceding the MoE subnetwork. In other implementations, the MoE subnetwork input can be a network input received by the system, e.g., from a user of the system. The MoE subnetwork includes multiple expert neural networks and a gating subsystem that includes one or more gating subnetworks. Each expert neural network is configured to process a respective expert input, i.e., either the first layer output or the network input, in accordance with the current values of a respective set of expert parameters of the expert neural network to generate a respective expert output. Each expert neural networks can be indexed, with the system maintaining a listing of indices (e.g., in the form of integers) assigned to different expert neural networks, so that a particular expert neural network can be uniquely identified from among the multiple networks by using its corresponding index.

The system applies, by using the gating subsystem, a softmax function to a set of gating parameters having adjustable (i.e., learnable) values to generate a respective softmax score for each of one or more of the plurality of expert neural networks (step 204). For example, during training the values of the gating parameters may be referred to as the "current," or "training" values, and after training, the values of the gating parameters may be referred to as the "trained" values. In some implementations, the gating subsystem is configured to generate the softmax scores for at most a fixed number of expert neural networks, which may be smaller than a total number of experts neural networks included in the MoE subnetwork. For example, the system can receive a user input specifying an integer value k as the fixed number of expert neural networks that can be selected from a total of n expert neural networks.

In addition, for each of the one or more of the plurality of expert neural networks, the system can generate a one-hot encoding of the corresponding index of the expert neural network. A one-hot encoding is a fixed length representation with binary values, where exactly one value is "1" and all other values are "0". In some implementations, the system can generate the one-hot encodings by using a selector function which, at a high-level, is a function that can be used to return the one-hot encoding of the index of any single expert neural network out of the n expert neural networks.

The selector function is parameterized by m (where $m = \log_2 n$) binary variables, $z_1, z_2, \ldots, z_m$, the values of which may be learned through training. Collectively, these binary variables represent a binary number: $z_m z_{m-1} \ldots z_1$ which in turn represents the index (in the form of an integer) of the expert neural network to select. For example, in the case of 5 experts, the selector function can be used to select the first expert neural network by returning the binary vector $[1\ 0\ 0\ 0\ 0]^T$. Mathematically, assuming l is the integer represented by the binary number $z_m z_{m+1} \ldots z_1$, the selector function $r: \mathbb{R}^m \to \{0,1\}^n$ is a function that maps z: $=[z_m\ z_{m-1} \ldots z_1]^T$ to a one-hot encoding of the integer (l+1). For any non-negative integer l, B(l) is defined as the set of indices of the non-zero entries in the binary representation of l (where the least significant bit is indexed by 1). For example, B(0)=∅, B(1)={1}, B(2)={2}, and B(3)={1,2}. For every i∈[n], the i-th entry of r(z) can be defined as follows:

$$r(z)_i = \prod_{j \in B(i-1)} (z_j) \prod_{j \in [m] \setminus B(i-1)} (1 - z_j). \quad \text{(Equation 1)}$$

In the above, $r(z)_i$ is a product of m binary variables, which is equal to 1 if and only if the integer (i−1) is represented by the binary number $z_m z_{m-1} \ldots z_1$. Therefore, r(z) returns a one-hot encoding of the index of the selected expert neural network.

The system determines, by using the gating subsystem, and from the one-hot encodings and the softmax scores, a respective weight for each of the one or more of the plurality of expert neural networks (step 206). Specifically, for each of the one or more of the plurality of expert neural networks, the gating subsystem can apply a smooth-step function to the one-hot encoding of the corresponding index for the expert neural network to generate a smoothened one-hot encoding for the expert neural network, and then determine, from the smoothened one-hot encoding and the softmax score, the respective weight for the expert neural network. For example, the respective weight for each expert neural network can be determined by computing a product of the respective smoothened one-hot encoding and the respective softmax score.

In general, the smooth-step function can be an S-shaped function—similar in shape to the logistic function—that is continuously differentiable. However, unlike the logistic function, the smooth-step function should output 0 or 1 exactly for inputs with an arbitrarily large magnitude.

As a particular example, the smooth-step function is a cubic piecewise polynomial defined as:

$$S(t) = \begin{cases} 0 & \text{if } t \leq -\gamma/2 \\ -\frac{2}{\gamma^3} t^3 + \frac{3}{2\gamma} t + \frac{1}{2} & \text{if } -\gamma/2 \leq t \leq \gamma/2, \\ 1 & \text{if } t \geq \gamma/2 \end{cases} \quad \text{(Equation 2)}$$

where γ is a tunable hyperparameter that controls a width of a fractional region of the smooth-step function (i.e., the region where the function is strictly between 0 and 1).

In this example, for every index i∈[k], assuming that $z^{(i)} \in \{0,1\}^m$ is a learnable binary vector (where $m = \log_2 n$), the output of the i-th instance of the selector function is $r(z^{(i)})$, and assuming Z is a k×m matrix whose i-th row is $z^{(i)}$, the system can determine the respective weights for the one or more of the plurality of expert neural networks by relaxing every binary variable in Z to be continuous in the range (−∞, +∞), i.e., $Z \in \mathbb{R}^{k \times m}$, and then applying the smooth-step function to Z element-wise. Mathematically, the weights can be computed as a continuously differentiable function q̃ defined as follows:

$$\tilde{q}(\alpha, Z) := q(\alpha, S(Z)) = \sum_{i=1}^k \sigma(\alpha)_i r(S(z^{(i)})),$$

where the matrix S(Z) is obtained by applying S(•) to Z element-wise, σ(•) is the softmax function, and $\alpha \in \mathbb{R}^k$ is a vector of learnable gating parameters. Since the encoding matrix of the expert neural networks is binary, S(Z) is binary, and q̃(α,Z) generates at most k non-zero weights for a total of n expert neural networks.

In some implementations, the gating subsystem maintains different sets of gating parameters (associated with different gating engines) that each have different parameter values, and the system can repeatedly perform steps 204-206 to generate multiple weights for each of the one or more of the plurality of expert neural networks. For example, for any given expert neural network, the system can generate a respective weight for the expert neural network for each of the one or more machine learning tasks that the neural network is configured to perform.

The system selects, by using the gating subsystem, and based on the respective weights, a proper subset of the plurality of expert neural networks (step 208). Specifically, the system selects only expert neural networks that have non-zero weights. The system also provides the input to the MoE subnetwork as expert input to each of the selected expert neural networks. Each of the selected expert neural networks is configured to process the expert input in accordance with the respective current values of parameters of the selected expert neural network to generate a respective expert output.

In some implementations, the system selects a respective proper subset of the plurality of expert neural networks for each of the one or more machine learning tasks that the neural network is configured to perform. That is, the system can select different expert neural networks, or different combinations of the expert neural networks, to perform different machine learning tasks on the same network input.

In some implementations, for each of the one or more of the plurality of expert neural networks, the gating subsystem pre-computes the one or more weights and stores these weights for future use, e.g., at a memory or a data storage that is accessible to the system. Optionally, in some of these implementations, from step 202 the method may directly proceed to step 208, i.e., for every obtained MoE subnetwork input, the system can retrieve and use the pre-computed weights (instead of repeatedly determining these weights for every input ad lib) to select the expert neural networks for processing the MoE subnetwork input. Further optionally, in some of these implementations, the system can include only the expert neural networks associated with non-zero weights (and not any expert neural networks associated with zero weights), and from step 202 the method may even directly proceed to step 210. That is, data that specifies the architectures and associated parameters of the expert neural networks associated with weights that have been pre-computed to be zero may be discarded and, for every obtained MoE subnetwork input, the system can proceed to use the all of the expert neural networks included in the system—i.e., the expert neural networks associated with weights that have been pre-computed to be non-zero—for processing the MoE subnetwork input.

The system combines, by using the gating subsystem, the respective expert outputs generated by the one or more expert neural networks in the proper subset in accordance with the respective weights for the one or more of the plurality of expert neural networks to generate one or more MoE outputs for the one or more machine learning tasks that the neural network in configured to perform (step 210). In particular, for each of the one or more machine learning tasks that the neural network is configured to perform, the system weights the expert output generated by each of the selected expert neural networks by the weight for the selected expert neural network to generate a weighted expert output, and sums the weighted expert outputs to generate the MoE output. The system then provides the MoE output as input to a second neural network layer following the MoE subnetwork for further processing to generate the network output for the machine learning task. Alternatively, the system directly uses the MoE output as the network output for the task.

Figure 3:
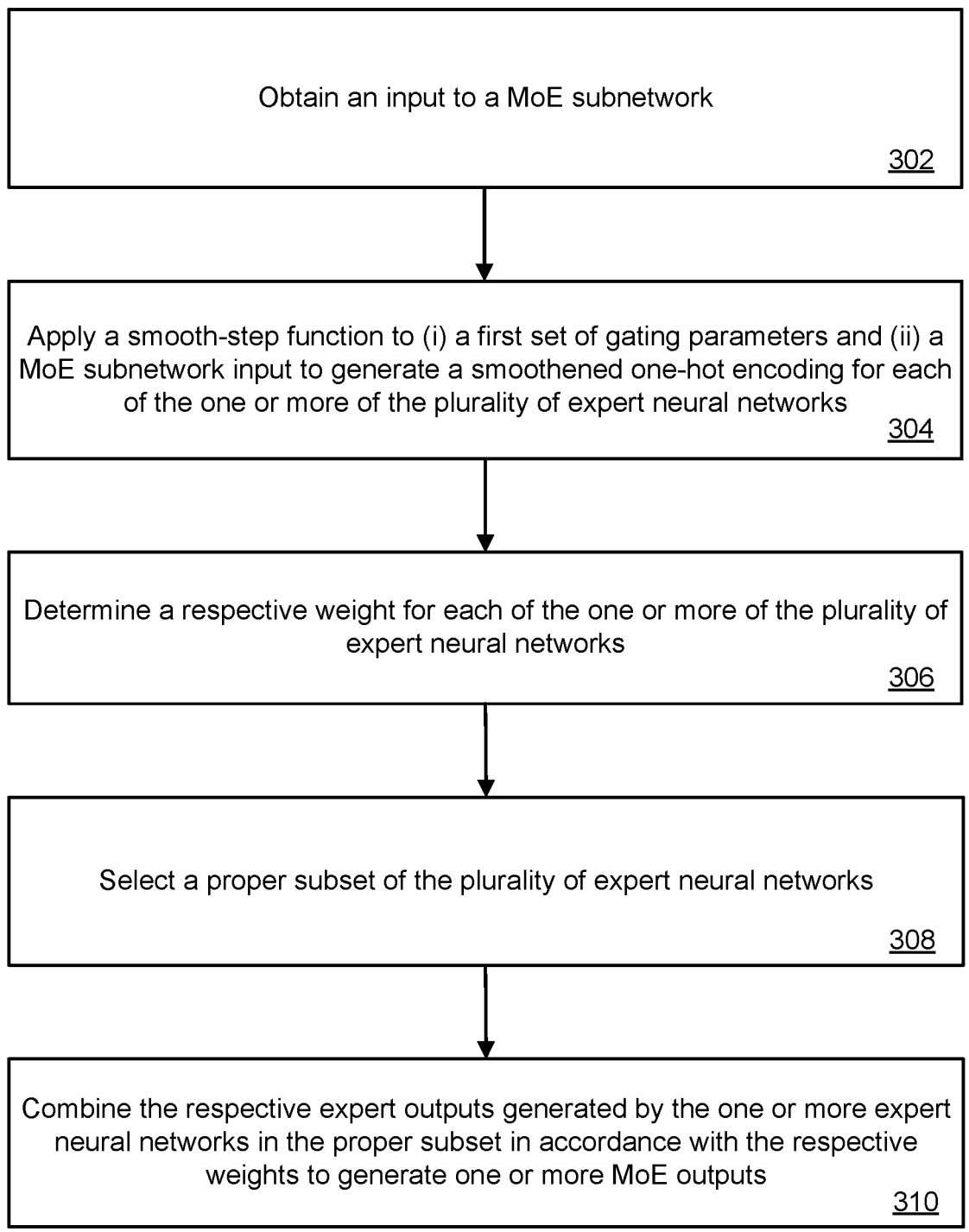
FIG. 3 is a flow diagram of another example process for generating one or more mixture-of-experts (MoE) outputs for an input using a MoE subnetwork.

FIG. 3 is a flow diagram of another example process 300 for generating one or more mixture-of-experts (MoE) outputs for an input using a MoE subnetwork, e.g., the MoE subnetwork 130 of FIG. 1. For convenience, the process 300 will be described as being performed by a system of one or more computers located in one or more locations. For example, a neural network system, e.g., the neural network system 100 of FIG. 1, appropriately programmed, can perform the process 300.

By performing process 300 the system can generate the one or more MoE outputs through "per-input gating," where the selection of the subset of the expert neural networks included in a MoE subnetwork are selected dependently on the input. In particular, the system can generate respective MoE outputs for one or more machine learning tasks on a same network input.

The system obtains an input to a MoE subnetwork (step 302). In some implementations, the MoE subnetwork input can be a first layer output generated by a neural network layer preceding the MoE subnetwork. In other implementations, the MoE subnetwork input can be a network input received by the system, e.g., from a user of the system. The MoE subnetwork includes multiple expert neural networks and a gating subsystem that includes one or more gating subnetworks. Each expert neural network is configured to process a respective expert input, i.e., either the first layer output or the network input, in accordance with the current values of a respective set of expert parameters of the expert neural network to generate a respective expert output. Each expert neural networks can be indexed, with the system maintaining a listing of indices (e.g., in the form of integers) assigned to different expert neural networks, so that a particular expert neural network can be uniquely identified from among the multiple networks by using its corresponding index. In addition, for each of the one or more of the plurality of expert neural networks, the system can generate a one-hot encoding of the corresponding index of the expert neural network. For example, the system can do this by using equation 1 described above.

The system applies, by using the gating subsystem, a smooth-step function to (i) a first set of gating parameters having first adjustable values and (ii) a MoE subnetwork input to generate a smoothened one-hot encoding for each of the one or more of the plurality of expert neural networks (step 304). To this this, the system can compute a first product of (i) the first set of gating parameters having the first adjustable values and (ii) the MoE subnetwork input, and then apply the smooth-step function to the first product.

For example, the smooth-step function can be the cubic piecewise polynomial function described above as Equation 2.

In addition, the system applies a softmax function to (i) a second set of gating parameters having second adjustable values and (ii) the MoE subnetwork input to generate a respective softmax score for each of one or more of the plurality of expert neural networks. Likewise, the system can compute a second product of (i) the second set of gating parameters having the second adjustable values and (ii) the MoE subnetwork input, and then apply the softmax function to the second product.

The system determines, by using the gating subsystem, and from the smoothened one-hot encodings and the softmax scores, a respective weight for each of one or more of the plurality of expert neural networks (step 306).

For example, for every index $i \in [k]$, assuming that $G \in \mathbb{R}^{k \times p}$ and $W(i) \in \mathbb{R}^{m \times p}$ are the first and second sets of learnable gating parameters, given a MoE subnetwork input $x \in \mathbb{R}^p$, and setting $\alpha = Gx$ and $z(i) = W^{(i)}x$ in the function $\tilde{q}(a, Z)$ described above, the input-dependent weights can be computed as a function $v$ defined as follows $$v(G, W, x) = \sum_{i=1}^{k} \sigma(Gx)_i r(S(W^{(i)}x)).$$

In the above, the term $r(S(W^{(i)}x))$ represents the i-th instance of the selector function, whose output depends on the MoE subnetwork input x; thus different network inputs may result in selection of different (combinations of) expert neural networks. The term $\sigma(Gx)_i$ determines the input-dependent weight assigned to the i-th selector. Notably the function $v(G, W, x)$ is continuously differentiable in the gating parameters G and W. Similar to the case of static gating, since $S(W^{(i)}x)$ is binary for all $i \in [k]$, each $r(S(W^{(i)}x))$ will generate exactly one non-zero weight, and the MoE subnetwork input x will be routed to at most k expert neural networks.

In some implementations, the gating subsystem maintains different sets of first and second gating parameters (associated with different gating engines) that each have different parameter values, and the system can repeatedly perform steps 304-306 to generate multiple input-dependent weights for each of the one or more of the plurality of expert neural networks. For example, for any given expert neural network, the system can generate a respective weight for the expert neural network for each of the one or more machine learning tasks that the neural network is configured to perform.

The system selects, by using the gating subsystem, and based on the respective weights, a proper subset of the plurality of expert neural networks (step 308). Specifically, the system selects only expert neural networks that have non-zero weights. The system also provides the input to the MoE subnetwork as expert input to each of the selected expert neural networks. Each of the selected expert neural networks is configured to process the expert input in accordance with the respective current values of parameters of the selected expert neural network to generate a respective expert output.

In some implementations, the system selects a respective proper subset of the plurality of expert neural networks for each of the one or more machine learning tasks that the neural network is configured to perform. That is, the system can select different expert neural networks, or different combinations of the expert neural networks, to perform different machine learning tasks on the same network input.

The system combines, by using the gating subsystem, the respective expert outputs generated by the one or more expert neural networks in the proper subset in accordance with the respective weights for the one or more of the plurality of expert neural networks to generate one or more MoE outputs for the one or more machine learning tasks that the neural network in configured to perform (step 310). In particular, for each of the one or more machine learning tasks that the neural network is configured to perform, the system weights the expert output generated by each of the selected expert neural networks by the weight for the selected expert neural network to generate a weighted expert output, and sums the weighted expert outputs to generate the MoE output. The system then provides the MoE output as input to a second neural network layer following the MoE subnetwork for further processing to generate the network output for the machine learning task. Alternatively, the system directly uses the MoE output as the network output for the task.

During training of the neural network 102, the process 200 or 300 can be used as part of generating a network output for a training input, in order to train the neural network 102 to determine learned values for the sets of gating parameters and the respective expert parameters. The training can make use of a gradient descent with backpropagation training technique that uses a conventional optimizer, e.g., stochastic gradient descent, Adam, or Adagrad optimizer, where the gradient of an objective function can be backpropagated to adjust the values of the parameters of various components of the neural network 102 to improve the quality of the training network output (or another output derived from the training network output), e.g., relative to a known output for the training input (e.g., a ground truth output associated with the training input). In particular, the training can be end-to-end by virtue of the continuously differentiable nature of the gating mechanism, i.e., the training can jointly and effectively update respective values of the one or more sets of the gating parameters of the gating subsystem 110 based on the computed gradient, as well as update, through backpropagation of the gradient through the gating parameters, the values of the expert parameters of the expert neural networks included in the MoE subnetwork 130, while guaranteeing the smoothness in updating the gating parameters, expert network parameters, or both and thereby avoiding, for example, oscillatory (or bouncing) parameter values during training.

During training, the system can incorporate any number of techniques to improve the speed, the effectiveness, or both of the training process.

In some examples, multi-task learning can be applied to train the neural network on multiple tasks simultaneously by using a shared MoE subnetwork (and possibly other components of the neural network). Generally, multi-task learning is aimed at leveraging the information of multiple, mutually related tasks to make more accurate predictions for the individual tasks. In these examples, the gating subsystem can be configured to implement a respective gating engine for each task which adaptively determines whether to share expert neural networks with other tasks.

In some examples, each binary variable $Z_{ij}$ that parameterizes the selector function can be initialized so that $0<S(Z_{ij})<1$. This ensures that the gating subsystem is trainable by ensuring that non-zero gradients are computed with respect to $Z_{ij}$ at the start of the training.

Early stopping of the optimizer can be desired in practice for computational and statistical considerations, although this may prevent the smoothened one-hot encodings $S(Z)$ from converging. Thus, in some examples, to encourage faster convergence toward one-hot encoded vectors, an entropy regularization term can be added to the objective function. In some of these examples, the entropy regularization term can be computed by applying an entropy function to the smoothened one-hot encodings, weighted by a non-negative hyperparameter $\lambda$ that controls the rate at which each instance of the selector function converges to a one-hot encoding.

After training, the system can process an inference using only the selected expert neural networks in the proper subset, i.e., expert neural network associated with non-zero weights, by computing a fixed, weighted combination of expert outputs of the selected expert neural networks. Optionally, the system discards data that specifies the architectures and associated parameters of the expert neural networks that are not in the proper subset for any of the one or more machine learning tasks that the neural network is configured to perform, i.e., expert neural networks associated with zero weights, thereby further reducing the memory footprint of the neural network.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system for performing one or more machine learning tasks on a network input to generate one or more network outputs, the system comprising one or more computers and one or more storage devices storing instructions that, when executed by the one or more computers, cause the one or more computers to implement:
    a main neural network configured to receive the network input and to process the network input to generate the one or more network outputs, the main neural network comprising a Mixture of Experts (MoE) subnetwork, wherein the MoE subnetwork comprises:
        a plurality of expert neural networks, wherein each expert neural network is configured to process a respective expert input in accordance with a respective set of expert parameters of the expert neural network to generate a respective expert output, and
        a gating subsystem configured to:
            obtain a respective weight for each of the plurality of expert neural networks that is independent of a MoE input to the MoE subnetwork, wherein the respective weight has been learned through training based on a set of gating parameters of the gating subsystem; and
            combine the respective expert outputs generated by the plurality of expert neural networks in accordance with the respective weights for the plurality of expert neural networks to generate one or more MoE outputs.

2. The system of claim 1, wherein the gating subsystem is configured to, during the training of the main neural network:
    apply a softmax function to the set of gating parameters to generate a respective training softmax score for each of one or more of a training plurality of expert neural networks, wherein the training plurality of expert neural networks comprise the plurality of expert neural networks and one or more additional expert neural networks;
    apply a smooth-step function to a corresponding index for each of the one or more of the training plurality of expert neural networks to generate a smoothened one-hot encoding for each of the one or more of the training plurality of expert neural networks; and
    determine, from the smoothened one-hot encodings and the softmax scores, a respective training weight for each of one or more of the training plurality of expert neural networks.

3. The system of claim 2, wherein the smooth-step function is a cubic piecewise polynomial defined as $$S(t) = \begin{cases} 0 & \text{if } t \leq -\gamma/2 \\ -\frac{2}{\gamma^3}t^3 + \frac{3}{2\gamma}t + \frac{1}{2} & \text{if } -\gamma/2 \leq t \leq \gamma/2, \\ 1 & \text{if } t \geq \gamma/2 \end{cases}$$

where $\gamma$ is a tunable hyperparameter that controls a width of a fractional region of the smooth-step function.

4. The system of claim 2, wherein determining the respective training weight for each of the one or more of the training plurality of expert neural networks comprises, for each expert neural network in the training plurality of expert neural networks:
    computing a product of the respective smoothened one-hot encoding and the respective training softmax score.

5. The system of claim 2, wherein the gating subsystem is configured to generate respective training softmax scores for at most a fixed number of expert neural networks, the fixed number being smaller than a total number of the training plurality of expert neural networks.

6. The system of claim 5, wherein the system is configured to receive a user input specifying the fixed number.

7. The system of claim 2, wherein the system comprises the one or more storage devices storing instructions that, when executed by the one or more computers, cause the one or more computers to perform operations comprising:
    deploying the plurality of expert neural networks but not the one or more additional expert neural networks to perform the one or more machine learning tasks.

8. The system of claim 1, wherein the respective expert input is the network input.

9. The system of claim 1, wherein the respective expert input is an output of a first neural network layer of the main neural network.

10. The system of claim 1, wherein the one or more network outputs comprise the one or more MoE outputs.

11. A system for performing one or more machine learning tasks on a network input to generate one or more network outputs, the system comprising one or more computers and one or more storage devices storing instructions that, when executed by the one or more computers, cause the one or more computers to implement:
   a main neural network configured to receive the network input and to process the network input to generate the one or more network outputs, the main neural network comprising a Mixture of Experts (MoE) subnetwork, wherein the MoE subnetwork comprises:
      a plurality of expert neural networks, wherein each expert neural network is configured to process a respective expert input in accordance with a respective set of expert parameters of the expert neural network to generate a respective expert output, and
      a gating subsystem configured to:
         apply a smooth-step function to (i) a first set of gating parameters having first learned values and (ii) a MoE subnetwork input to generate a smoothened one-hot encoding for each of the one or more of the plurality of expert neural networks;
         determine, from at least the smoothened one-hot encodings, a respective weight for each of one or more of the plurality of expert neural networks;
         select, based on the respective weights, a proper subset of the plurality of expert neural networks; and
         combine the respective expert outputs generated by the one or more expert neural networks in the proper subset in accordance with the respective weights for the one or more of the plurality of expert neural networks to generate one or more MoE outputs.

12. The system of claim 11, wherein the gating subsystem is further configured to:
   apply a softmax function to (i) a second set of gating parameters having second learned values and (ii) the MoE subnetwork input to generate a respective softmax score for each of one or more of the plurality of expert neural networks; and
   determine, from the smoothened one-hot encodings and the softmax scores, the respective weight for each of one or more of the plurality of expert neural networks.

13. The system of claim 11, wherein applying the smooth-step function to (i) the first set of gating parameters having first learned values and (ii) the MoE subnetwork input comprises:
   computing a first product of (i) the first set of gating parameters having the first learned values and (ii) the MoE subnetwork input; and
   applying the smooth-step function to the first product.

14. The system of claim 12, wherein applying the softmax function to (i) the second set of gating parameters having second learned values and (ii) the MoE subnetwork input comprises:
   computing a second product of (i) the second set of gating parameters having the second learned values and (ii) the MoE subnetwork input; and
   applying the softmax function to the second product.

15. The system of claim 11, wherein the smooth-step function is a cubic piecewise polynomial defined as $$S(t) = \begin{cases} 0 & \text{if } t \le -\gamma/2 \\ -\frac{2}{\gamma^3}t^3 + \frac{3}{2\gamma}t + \frac{1}{2} & \text{if } -\gamma/2 \le t \le \gamma/2, \\ 1 & \text{if } t \ge \gamma/2 \end{cases}$$

where $\gamma$ is a tunable hyperparameter that controls a width of a fractional region of the smooth-step function.

16. The system of claim 11, wherein the MoE subnetwork input is the expert input.

17. One or more non-transitory computer storage media storing instructions that when executed by one or more computer cause the one or more computer to implement:
   a main neural network configured to receive a network input and to process the network input to generate one or more network outputs, the main neural network comprising a Mixture of Experts (MoE) subnetwork, wherein the MoE subnetwork comprises:
      a plurality of expert neural networks, wherein each expert neural network is configured to process a respective expert input in accordance with a respective set of expert parameters of the expert neural network to generate a respective expert output, and
      a gating subsystem configured to:
         apply a smooth-step function to (i) a first set of gating parameters having first learned values and (ii) a MoE subnetwork input to generate a smoothened one-hot encoding for each of the one or more of the plurality of expert neural networks;
         determine, from at least the smoothened one-hot encodings, a respective weight for each of one or more of the plurality of expert neural networks;
         select, based on the respective weights, a proper subset of the plurality of expert neural networks; and
         combine the respective expert outputs generated by the one or more expert neural networks in the proper subset in accordance with the respective weights for the one or more of the plurality of expert neural networks to generate one or more MoE outputs.

18. The computer storage media of claim 17, wherein the gating subsystem is further configured to:
   apply a softmax function to (i) a second set of gating parameters having second learned values and (ii) the MoE subnetwork input to generate a respective softmax score for each of one or more of the plurality of expert neural networks; and
   determine, from the smoothened one-hot encodings and the softmax scores, the respective weight for each of one or more of the plurality of expert neural networks.

19. A method comprising:
receiving a network input; and
processing the network input using a main neural network implemented by one or more computers and comprising a Mixture of Experts (MoE) subnetwork to generate the one or more network outputs, wherein the MoE subnetwork comprises:
   a plurality of expert neural networks, wherein each expert neural network is configured to process a respective expert input in accordance with a respective set of expert parameters of the expert neural network to generate a respective expert output, and
   wherein processing the network input using the main neural network comprises:
      applying a smooth-step function to (i) a first set of gating parameters having first learned values and (ii) a MoE subnetwork input to generate a smoothened one-hot encoding for each of the one or more of the plurality of expert neural networks;
      determining, from at least the smoothened one-hot encodings, a respective weight for each of one or more of the plurality of expert neural networks;

selecting, based on the respective weights, a proper subset of the plurality of expert neural networks; and combining the respective expert outputs generated by the one or more expert neural networks in the proper subset in accordance with the respective weights for the one or more of the plurality of expert neural networks to generate one or more MoE outputs.

20. The method of claim 19, wherein processing the network input using the main neural network further comprises:

applying a softmax function to (i) a second set of gating parameters having second learned values and (ii) the MoE subnetwork input to generate a respective softmax score for each of one or more of the plurality of expert neural networks; and determining, from the smoothened one-hot encodings and the softmax scores, the respective weight for each of one or more of the plurality of expert neural networks.

21. The method of claim 20, wherein applying the smooth-step function to (i) the first set of gating parameters having first learned values and (ii) the MoE subnetwork input comprises:

computing a first product of (i) the first set of gating parameters having the first learned values and (ii) the MoE subnetwork input, and applying the smooth-step function to the first product; and wherein applying the softmax function to (i) the second set of gating parameters having second learned values and (ii) the MoE subnetwork input comprises:

computing a second product of (i) the second set of gating parameters having the second learned values and (ii) the MoE subnetwork input, and applying the softmax function to the second product.

* * * * *